(12) United States Patent
Zu

(10) Patent No.: US 11,138,653 B1
(45) Date of Patent: Oct. 5, 2021

(54) SYSTEM AND METHOD OF PURCHASE VERIFICATION FOR CROWDSOURCING REFERRAL

(71) Applicant: KeKeQiHuo (Shenzhen) Technologies Co., Ltd., Guangdong (CN)

(72) Inventor: Keke Zu, Solna (SE)

(73) Assignee: KeKeQiHuo (Shenzhen) Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/884,075

(22) Filed: May 27, 2020

(51) Int. Cl.
  *G06Q 30/00* (2012.01)
  *G06Q 30/06* (2012.01)
  *G06Q 30/02* (2012.01)

(52) U.S. Cl.
  CPC ..... *G06Q 30/0637* (2013.01); *G06Q 30/0214* (2013.01); *G06Q 30/0225* (2013.01); *G06Q 30/0609* (2013.01); *G06Q 30/0631* (2013.01)

(58) Field of Classification Search
  None
  See application file for complete search history.

(56) References Cited

U.S. PATENT DOCUMENTS

| | | | |
|---|---|---|---|
| 6,405,175 B1 | 6/2002 | Ng | |
| 8,688,524 B1 | 4/2014 | Ramalingam et al. | |
| 8,732,011 B2 | 5/2014 | Bezos et al. | |
| 2009/0157507 A1* | 6/2009 | Agius | G06Q 30/0239 705/14.39 |
| 2010/0010887 A1* | 1/2010 | Karlin | G06Q 30/0213 705/14.15 |
| 2011/0196725 A1* | 8/2011 | Malcolmson | G06Q 30/02 705/14.16 |

* cited by examiner

*Primary Examiner* — Mila Airapetian
(74) *Attorney, Agent, or Firm* — PROI Intellectual Property US; Klaus Michael Schmid

(57) ABSTRACT

The core inventive points of this patent are the verification of a purchasing activity for a crowdsourcing based system and/or platform. There are two main aspects, the verification of purchasing certification from two sources and the verification of the implemented purchasing actions. The system respectively obtains the purchase proof from the implementing user and the purchase certification from the corresponding business owner. A comparison process is implemented to verify whether these two sources of purchase certification can be matched with each other. Furthermore, an address obtaining process is triggered when pre-defined user responses and/or actions were received to generate one or multiple obtained address associated with timestamp. And one or multiple extracted purchase addresses is obtained by respectively extract purchase address from the two sources of purchase certificate. The verification of the implemented purchasing action is implemented by comparing the obtained purchasing address with the extracted purchase address.

17 Claims, 4 Drawing Sheets

SYSTEM AND METHOD OF PURCHASE VERIFICATION FOR CROWDSOURCING REFERRAL

1 FIELD OF INVENTION/KEYWORDS

Crowdsourcing referral, verification of crowdsourcing purchase, verified referral charging.

2 BACKGROUND OF INVENTION

A useful mechanism for identifying the origin of user traffic is part of HTTP. The protocol includes a field called "referrer", which usually contains the previous website or piece of content visited by the user agent (browser). This makes it possible for websites to know from which parts of the web its traffic is coming from, giving websites complete and instantaneous knowledge about the effectiveness of their advertisement campaigns.

The existence of the "referrer" field enabled the development of interesting business models, such as pay-per-click, popularized by Google Adwords. In this model, the business customer only pays for the advertisement that generated clicks, in complete opposition to former advertisement models used, for example, in broadcast media.

Crowdsourcing is a specific sourcing model in which individuals or organizations use contributions from internet users to obtain needed services or goods. One of the crowdsourcing examples is the Amazon Mechanical Turk (MTurk). The MTurk is a platform that enables the requesters (individuals and/or businesses) to publish tasks and jobs. In the other side, the crowdsourcing workers can select tasks, work on it, and get paid by delivering tasks to the requesters.

In this invention, the advertisement or purchasing referral information is provided in a crowdsourcing way, i.e. from the individuals and/or businesses. The purchase can also be implemented in a crowdsourcing way, i.e. a user can request other users to purchase for him or her. This invention focuses on the purchasing verification for crowdsourcing based referral systems and/or platforms, which in terms of online websites, mobile APPs, etc.

The purchasing referral information introduced in this invention is comprised by the information of referred products and/or services with at least one buying address. The various users introduced in this invention are listed below. The referred user is a crowdsourcing user who supplied a purchasing referral information to the said system and/or platform. The requesting user is a user who requests other users to implement a task (e.g. to purchase, to visit) for him or her. The implementing user is a user who reacts and implements a requested task from the said system and/or platform. It worth noting that the various users defined in this invention is from the logical functionality point of view. In practice, one natural person or business can perform of all the above defined logical functionalities or user roles in the said system and/or platform.

3 PROBLEM DESCRIPTION

For internet-based vendors, the pay-per-click solutions like Google Adwords can be an efficient and effective way to verify whether users visited the corresponding websites. However, for the so-called brick-and-mortar offline stores, the pay-per-click solutions cannot verify whether users physically visited the corresponding offline stores.

Furthermore, the pay-per-click solutions cannot verify users who searched the referral information (e.g. online advisement) really made a purchase at the corresponding online and/or offline stores.

Without the verified physical visit and/or purchase information, the pay-per-click provider like Google cannot justify their charging to the vendors especially for the offline store owners. For business like, restaurant, barbershop, cinema, coffee shop, amusement park, etc., they usually need customers to be physically there for getting the products and/or services. It is hard to be precise and fair to charge these kinds of business in the pay-per-click way.

Except for justifying the referral charging, the proposed purchasing verification is necessary when the purchase was implemented in a crowdsourcing way. For example, a requesting user can ask an implementing user to buy the referred products for him or her. The system and/or platform needs to justify the charging for the requesting user that the requested product or service is really purchased from the referred stores. In sum, there is a need for a system and/or platform to verify that a purchase is really generated from the referral information and/or the referred store (physically or online).

4 PRIOR ART

Most of the references regarding the referral service are focused on the rewarding to the person who referred.

U.S. Pat. No. 6,405,175 proposes methods on how to reward the submitting users for submitting product and price information. US20110196725A1 discloses a method for implementing an electronic customer referral service that both checks the new customer is distinct from the referring customer and tracks the referral so that the old customer gets credit for their referred new customer's action.

The proposed purchasing verification in this invention, however, is implemented by verifying whether a user made a purchase suggested by the purchasing referral information.

In sum, none of the listed prior arts have been proposed the similar solution like this invention.

5 BRIEF SUMMARY

The core inventive points of this patent are the verification of a purchasing activity implemented by one or multiple users of a crowdsourcing based system and/or platform. There are two main aspects, the verification of purchasing certification from two sources and the verification of the implemented one or multiple purchasing actions. The system and/or platform respectively obtains the purchase proof from the implementing user and the purchase certification from the corresponding business owner. A comparison process is implemented to verify whether these two sources of purchase certification can be matched with each other. Furthermore, an address obtaining process is triggered by pre-defined user responses and/or actions when interact with the said system and/or platform to generate the obtained address associated with timestamp. And one or multiple extracted purchase addresses is obtained by respectively extract purchase address and/or time from the purchase proof supplied by the implementing user and the purchase certification supplied by the business owner. The verification of the implemented purchasing action is implemented by comparing the one or multiple obtained purchasing address with the one or multiple extracted purchase address. Based on the verified purchase results, a charging fee to a business owner (e.g. the online and/or offline store owners) and/or a requesting user, a reward to the referred user, and a service fee to the implementing user are calculated and determined.

6 ADVANTAGE OF THE PROPOSED SOLUTION

A system and method of purchasing verification is proposed for crowdsourcing based referral systems and/or platform in this invention. The system and/or platform calculates the charging fee, reward and service fee based on the verified purchase results. Because the purchase from a referral information is verified, the charging to the referred business owners can be justified.

In the other hand, business models of crowdsourcing purchase can be enabled by the proposed purchase verification. That's, a requesting user can ask some other users to implement the purchase of referred products and/or services for him or her; An implementing user can buy and pay the referred products and/or services in advance for the requesting user and be paid back after the purchase verification is verified by the system and/or platform.

7 THE BRIEF DESCRIPTION OF THE DRAWINGS

Embodiments of the present disclosure will now be described, by way of example only, with reference to the accompanying drawings, in which like reference numerals are used for like parts, and in which.

8 DETAILED DESCRIPTION OF THE INVENTION

The purchasing referral information used in this invention is the introduction and description of referred products and/or services. The content of purchasing referral information can be expressed in but not limited to: text, picture, video, audio, symbol, virtual reality, sensory information (such as touch, taste, and smell), etc.

The purchasing referral information displayed in the system and/or platform should contain four types of information: attribute information, address information, recommendation information, and label information.

The attribute information is the information and parameters about the product and/or service itself. Generally, the attribute information includes but not limited to: product name, price, brand, photo, product specifications (such as color, weight, size, etc.), origin, function, usage, etc. The address information is from where the referred products and/or services can be obtained. The address information can be but not limited to: physical address (such as GPS, civic address, post address, indoor address, etc.), virtual address (such as network address, IP address, etc.), carriers which contain address information (such as images, videos, QR codes, etc.). The recommendation information is the direct or indirect experience, opinion, feeling, etc. regarding to the referred product and/or service. The recommendation information can be but not limited to: advertisement, selling points, story (e.g. brand story, symbolic meaning, business history, etc.), experience, product evaluation, etc. The label information is the descriptor that assigned to specific product and/or service. The label information can be but not limited to: category label, product feature label, user-defined label, etc.

The required purchasing referral information is provided by crowdsourcing users, i.e. individuals and/or businesses. For example, individual users can share and recommend products with buying address on the system and/or platform; store owners (online or offline) can introduce and advertise their products and/or services on the system and/or platform. Alternatively, the purchasing referral information can also be provided by the system and/or platform. For example, the purchasing referral information can be made by the dedicated operating team of the system and/or platform; or the purchasing referral information can be collected and/or generated by algorithms and/or mechanisms such as artificial intelligence; or the purchasing referral information can be obtained from a mix of both ways listed above.

Figure 1:
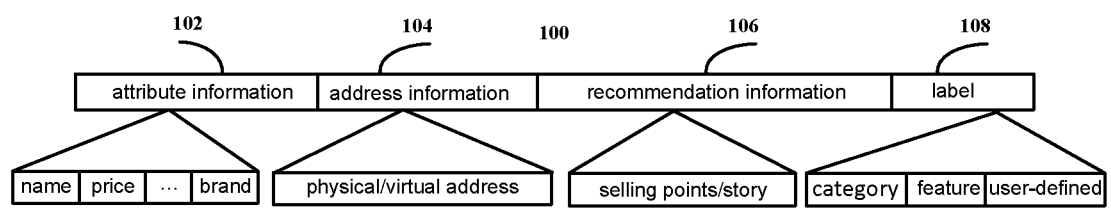
FIG. 1 shows an example illustrating the structure of the referral information.

As one embodiment, the system and/or platform requires the purchasing referral information from crowdsourcing users at least contain the necessary attribute information (such as, product name, price, product specifications, etc.) with at least one buying address. One example of the structure of the purchasing referral information used in the system and/or platform is illustrated in FIG. 1.

8.1 The Core Steps

Figure 2:
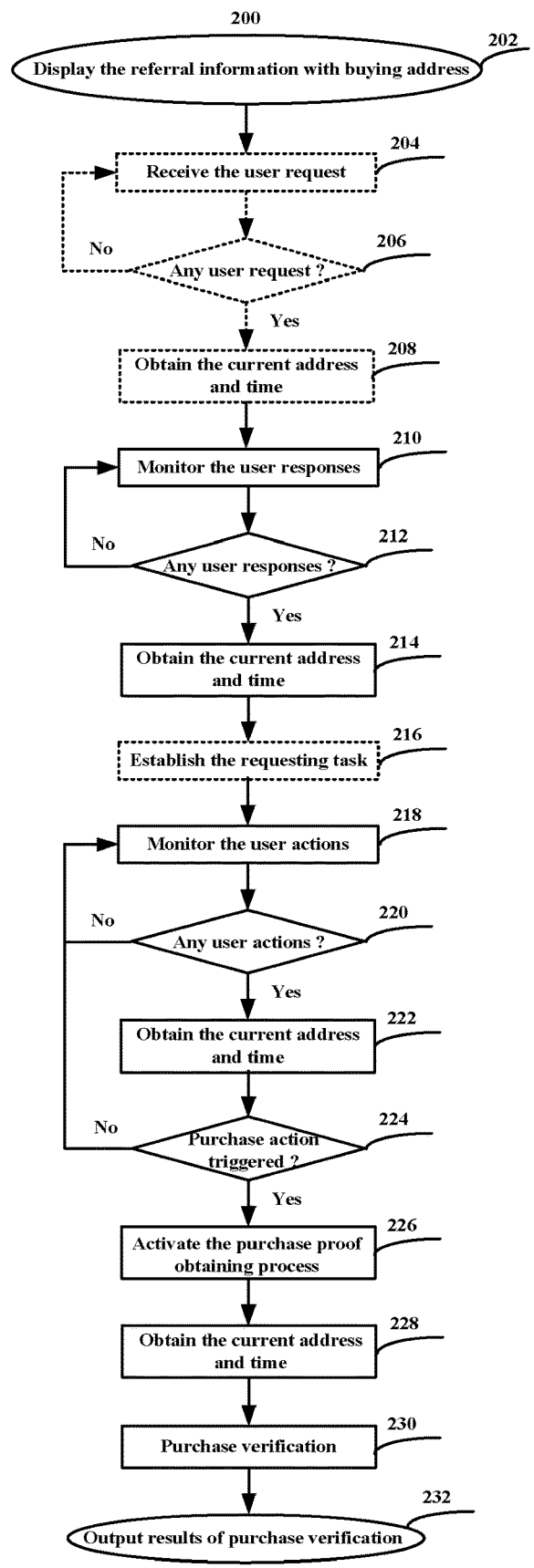
FIG. 2 shows a flow chart illustrating the core steps of this invention.

The core steps of this invention are illustrated in the flowchart in FIG. 2.

Step 1, the said system and/or platform display the purchasing referral information and receive the user request 204. After acquiring the purchasing referral information 100, one user can request other users to implement actions such as: to visit, to purchase, etc. for him or her. We term a user who requests others to implement tasks for him or her as the requesting user, a user who reacts and implements the requested tasks as the implementing user.

Associated with the purchasing referral information 100, the said system and/or platform can set buttons corresponding to various user requests for selection such as: visit for me, purchase for me, etc. A requesting user can also actively feedback or provide requests to the said system and/or platform. For example, a requesting user can actively send requesting orders, such as, requesting a visit for me, requesting a purchase for me, etc. to the said system and/or platform. When a specific user request is received by the system and/or platform, an address obtaining process 208 is triggered to obtain the current address (physical and/or virtual address, e.g. the GPS, IP, etc.) associated with timestamp of the requesting user.

The timestamp contains the data and time of the day to indicate when a system event occurred. The system event that can trigger the address obtaining process is predefined by system designer. The predefined system event can be but not limited to: a request was received, a request was accepted, a user action was received, a purchase proof from an implementing user was received, a purchase certification from a business owner was received.

Step 2, the said system and/or platform display the user requests and monitor responses from the other users 210. The other users can select to take the required tasks, such as: to visit a referred store for a requesting user, to purchase a referred product for a requesting user. When a requesting task is accepted by an implementing user, an address obtaining process 214 is activated by the system and/or platform to obtain the current address (physical and/or virtual address) associated with timestamp of the implementing user.

Alternatively, the requesting user can directly request the user who provided the referral information at the system and/or platform to implement a task, for example to purchase the referred product or service for him or her.

Step 3, the said system and/or platform establish the requesting task between the requesting and the implementing users 216. When a task was accepted by an implementing user, the system and/or platform feedback this status to the requesting user. Together with the feedback, the system and/or platform can also inform the total amount needed for implementing such a requesting task. The payment can be consisted by but not limited to: the cost of referred products and/or services, the labor cost of the implementing user, the traffic cost. Then, the requesting user needs to transfer the total amount, if there is any, to the system and/or platform. After the total amount for implementing the requested task is received, the system and/or platform feedback the task confirmation status and inform the implementing user to implement the requested tasks, e.g. to purchase products or services, for the requesting user.

Step 4, the said system and/or platform monitor the follow-up user actions 218. The user actions are the follow-up activities from the implementing user. The user actions can be but not limited to: visiting store, purchasing at store, uploading documents, taking photos or videos to the said system and/or platform. The system and/or platform can set buttons corresponding to various user actions for selection or to trigger. For example, when an implementing user is physically at the referred store and purchasing the referred products, he/she can select and trigger the 'purchasing' button provided by the said system and/or platform. When a user action was triggered and/or received, the address obtaining process 222 is activated by the system and/or platform to obtain the current address (physical and/or virtual) associated with timestamp of the implementing user.

Alternatively, the implementing user and/or the business owner can also actively feedback or provide the implemented user actions to the system and/or platform. For example, instead of providing various user actions for selection via the system and/or platform, the implementing user and/or the business owner can send a signal, for example in forms of a message, which contains current address associated with timestamp when a user action, such as 'purchasing', is implementing at a referred store.

If a purchasing action was triggered and/or received 224, a purchase proof obtaining process 226 is activated and executed by the system and/or platform. The purchase proof can be but not limited to: payment record, receipt, invoice, transaction record, the bought product, bill. The ways used by the said system and/or platform to obtain the purchase proof can be, but not limited to: by taking photos, taking videos, uploading documents (such as pictures, photos, videos, PDFs, etc.), providing information (such as invoice number, product ID, etc.). When a user is submitting the purchase proof to the system and/or platform, the address obtaining process 228 is activated to obtain the current address (physical and/or virtual) associated with timestamp of the user.

Step 5, the said system and/or platform implement the purchasing verification 230. When a purchasing action was implemented, the corresponding business owner needs to provide the corresponding purchase certificate such as a receipt to the system and/or platform. The system and/or platform verify whether the corresponding purchase proof from the implementing user and the purchase certification from the business owner can be matched with each other. The matching measurement can be implemented by a dedicated operating team, by crowdsourcing users, by algorithms and/or mechanisms such as artificial intelligence, or by a combination of the three. The items to be compared and measured are including but not limited to: the product name, the purchase amount, the invoice number, the purchase date and time, features of image, pixels.

Alternatively, the system and/or platform can also send the purchase proof from the implementing user to the corresponding business owner. And the business owner needs to verify the validity of user purchase and feedback the validity result to the system and/or platform. The first comparison result is thus formed by the comparison of the two sources purchase certification respectively from the implementing user and the corresponding business owner.

The system and/or platform can further verify the implemented purchase action by providing extra reference information to the purchase verification. The purchased address and time are usually contained in the purchase proof supplied by an implementing user, and/or the purchase certification supplied by the corresponding business owner. Thus, one or multiple extracted purchasing address with time can be obtained by extracting purchasing address and time from the purchase proof supplied by the implementing user and/or the purchase certification supplied by the business owner, respectively. In the other side, the requested buying address can be known from the purchasing referral information. Therefore, the second comparison result is formed by comparing the one or multiple extracted purchase address with the purchase address comprised in the purchasing referral information.

From the above Step 2 and Step 4, one or multiple sets of purchasing address associated with timestamp were obtained by the system and/or platform when a requested task was implemented by an implementing user. These addresses are termed as the obtained address.

The third comparison result is formed by comparing one or multiple obtained address of the implementing user with the purchase address comprised in the purchasing referral information and/or comparing one or multiple obtained address of the implementing user with one or multiple extracted purchase address.

Additionally, not only the purchasing address but also the purchasing time can be compared for the obtained address and the extracted address.

Thus, the validity of purchasing action can be further verified with the second and/or third comparison results. The verified purchasing action can be used as an extra reference information to add authentication for the implemented purchase. For example, the verified purchase address associated with timestamp can effectively prevent a store owner deny a user purchase; in the other side, it can effectively prevent a user providing fake purchase proof.

Step 6, the said system and/or platform calculate the charging fee to the business owner, reward to the user who referred, and a service fee to the implementing user based on the above obtained verification and/or comparison results. The system and/or platform count the transaction data from the verified purchase. The counted transaction data can be but not limited to, the number of verified purchases made from a purchasing referral information, the total amount of verified purchase from a purchasing referral information, ratio between visit and purchase for a referred store. Based on the transaction data of verified purchase, the said system and/or platform decide how to charge a business owner (such as online and/or offline store owners) who benefits from the purchasing referral information and how to reward a submitting user who provided the purchasing referral information. For the implementing user, the system and/or platform pay back his or her pre-paid cost for implementing the requested purchase after the implemented purchase passed the verification. Except that, the system and/or platform also calculate the amount that should reward the implementing user for the provided service to the requesting user.

Figure 3:
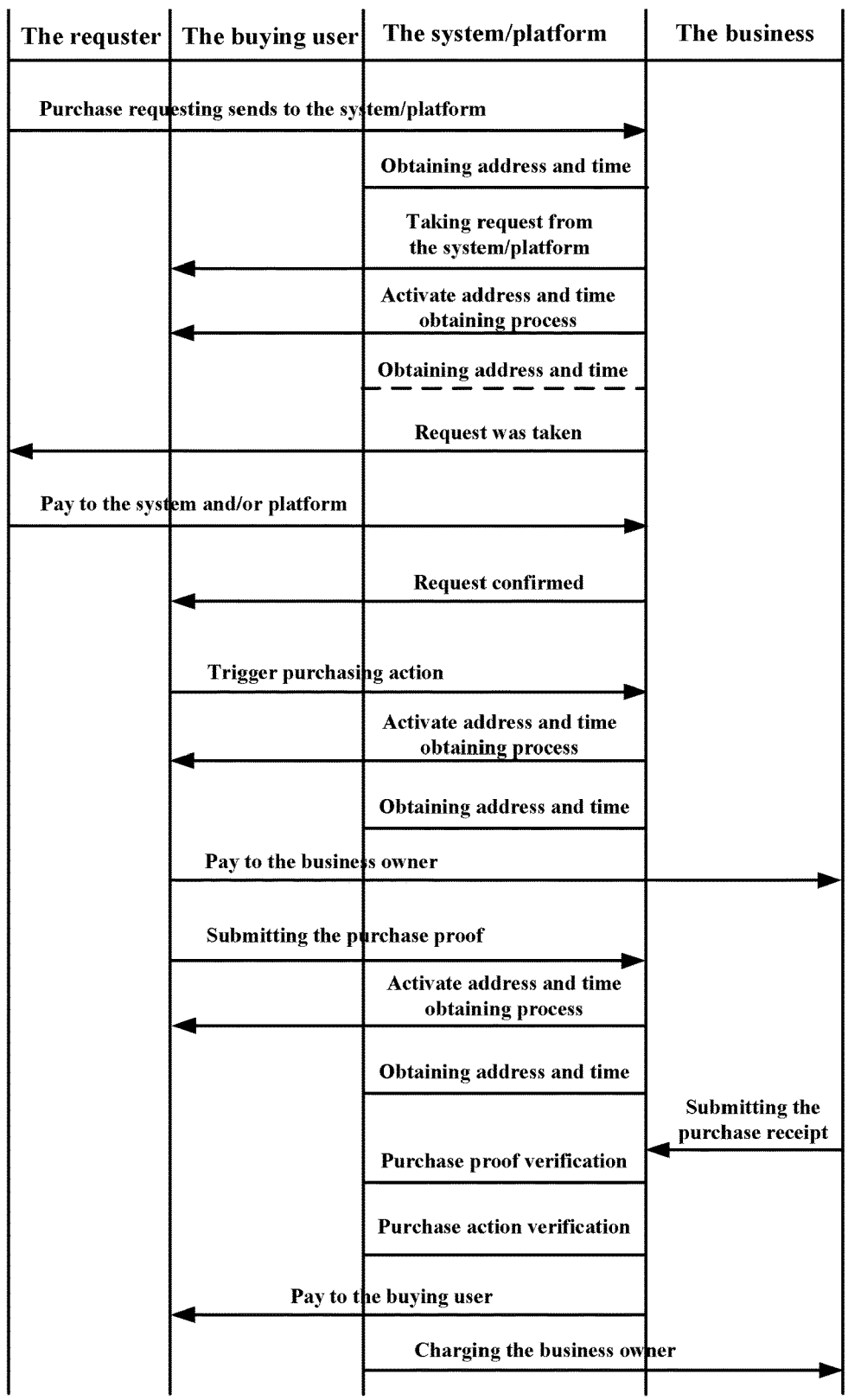
FIG. 3 shows a signaling of implementing the purchase verification.

The signaling of purchase verification implemented by the system and/or platform is illustrated in FIG. 3.

8.2 The Alternative Ways

Figure 4:
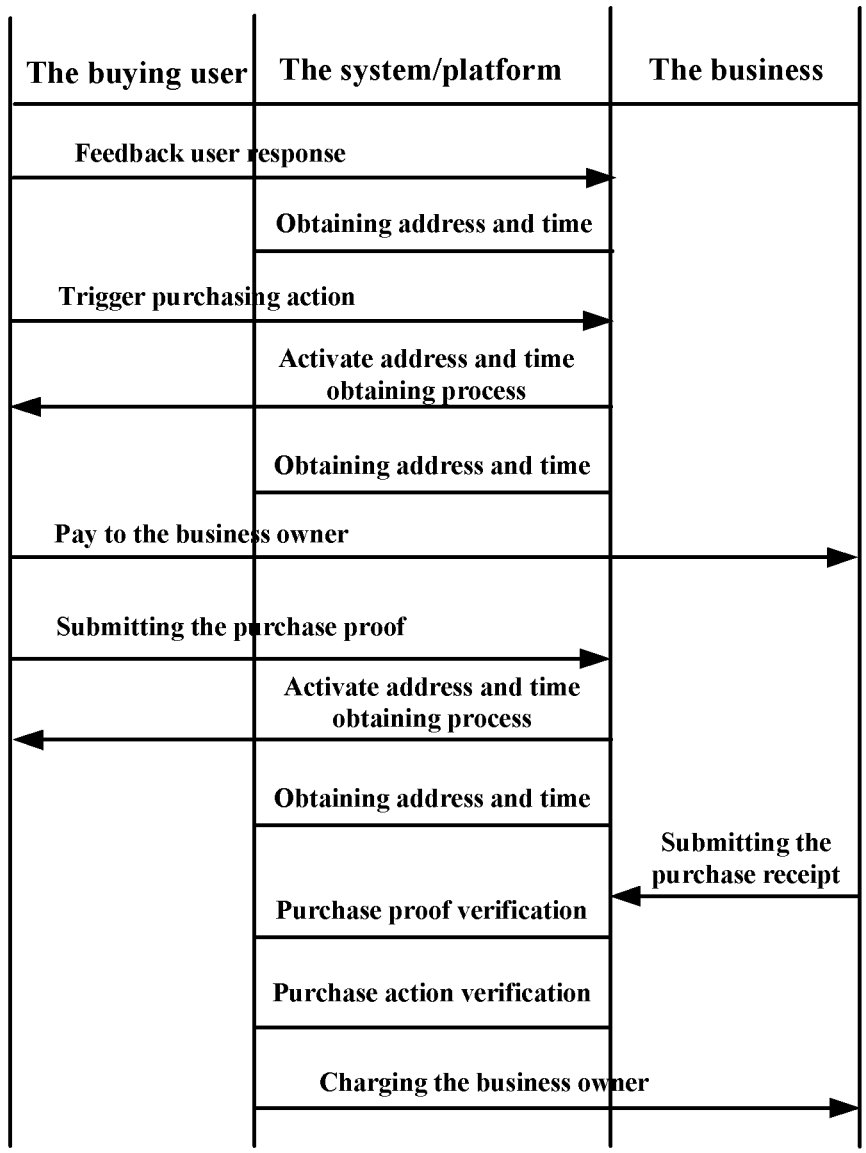
FIG. 4 shows a signaling of implementing the purchase verification for a single user.

Alternatively, the requesting and implementing user can be the same person, which is termed as the single user case in this invention. It is worth noting that the single user case shares the same framework of purchase verification with the requesting user case which is illustrated in FIG. 2. And the core steps of purchase verification for the single user case can be obtained by removing the blocks with dotted line in FIG. 2. Correspondingly, the user responses for the single user case monitored by the system and/or platform in 210 need to be changed as but limited to: to visit, to purchase, instead of to visit for a requesting user, to purchase for a requesting user. The signaling of purchase verification for the single user case is illustrated in FIG. 4.

9 ADDITIONAL CONSIDERATIONS

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss generality. The described operations and their associated modules may be embodied in software, firmware, hardware, or any combinations thereof. In one embodiment, a software module is implemented with a computer program product comprising a persistent computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a persistent computer readable storage medium or any type of media suitable for storing electronics instructions, and coupled to a computer system bus. Furthermore, any computing systems, referred to in the specification may include a single processor or may be architectures employing multiple processor designs for increased computing capability.

Finally, the language used in the specifications has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, an example of which is set forth in the following claims.

What is claimed is:

1. A method of verifying a purchasing activity implemented by one or more users of a crowdsourcing based purchasing referral system and/or platform, comprising the steps of:
   obtaining, by the purchasing referral system and/or platform, purchasing referral information, which contains information about a recommended product and/or service, from crowd sourcing users;
   displaying, by the purchasing referral system and/or platform, the purchasing referral information with a purchase address, which is a physical or a virtual address;
   receiving, by the purchasing referral system and/or platform, a task request electronically transmitted from a requesting user, wherein the user who requests other users to implement a task is the requesting user;
   monitoring, by the purchasing referral system and/or platform, one or more responses and one or more actions electronically received from the requesting user and an implementing user, wherein the user who reacts and implements the requested task is the implementing user;
   obtaining, by the purchasing referral system and/or platform, an address associated with a timestamp of the implementing user when one or more pre-defined system events and/or user actions are triggered or received, to generate an obtained address;
   obtaining, by the purchasing referral system and/or platform, a purchase proof and a purchase certificate respectively electronically received from the implementing user and a business owner, wherein a purchased product and/or service is provided by the business owner;
   comparing, by the purchasing referral system and/or platform, the obtained purchase proof from the implementing user with the purchase certificate from the business owner to produce a first comparison result;
   extracting, by the purchasing referral system and/or platform, a purchase address from the purchase proof electronically supplied by the implementing user and/or the purchase certification electronically supplied by the business owner, to obtain an extracted purchase address;
   comparing, by the purchasing referral system and/or platform, the extracted purchase address with the purchase address comprised in the purchasing referral information to produce a second comparison result;
   comparing, by the purchasing referral system and/or platform, the obtained address of the implementing user with the purchase address comprised in the purchasing referral information and/or comparing the obtained address of the implementing user with the extracted purchase address to produce a third comparison result;
   verifying, by the purchasing referral system and/or platform, a validity of a purchase action based on the first comparison result, and verifying the validity of the purchase action by an implementing user based on the second and/or the third comparison results; and
   determining, by the purchasing referral system and/or platform, based on the verification and/or the comparison results, a fee to be charged on the business owner, a reward to the user who provided the purchasing referral information, and a service fee to be paid to the implementing user.

2. The method of claim 1, wherein the purchasing referral information used by the system and/or platform is provided by crowd sourcing users including individuals and/or businesses, and contains four types of information: attribute information, address information, recommendation information, and label information.

3. The method of claim 1, wherein the purchasing referral information used by the system and/or platform comprises at least necessary attribute information including at least one of a product name, a price, product specifications, an origin, a function, and a usage together with a buying address including at least one of an address of a global positioning system (GPS), a civic address, a post address, an indoor address, a network address, and an IP address.

4. The method of claim 2, wherein the purchasing referral information used by the system and/or platform comprises at least necessary attribute information including at least one of a product name, a price, product specifications, an origin, a function, and a usage together with a buying address including at least one of a GPS address, a civic address, a post address, an indoor address, a network address, and an IP address.

5. The method of claim 1, wherein the system and/or platform provide an interface to obtain the purchase proof including at least one of a payment record, a receipt, an invoice, and a bill, from the implementing user and/or the purchase certification including a receipt from the business owner comprising at least one of photos, videos, uploaded documents and information.

6. The method of claim 1, wherein the verification of purchasing activity is implemented by comparing and/or measuring a matching degree of the purchase proof supplied by the implementing user and the purchase certification supplied by the business owner.

7. The method of claim 6, wherein items to be compared and measured for the purchasing verification include at least one of a product name, a purchase amount, an invoice number, a purchase date and time, and features of an image.

8. The method of claim 1, wherein an interface is provided by the system and/or platform to monitor and/or receive one or more responses and one or more actions from a requesting user and/or an implementing user.

9. The method of claim 8, wherein the user responses and actions comprise at least one of submitting a user request comprising at least one of requesting a visit, and requesting a purchase, feeding back a user response, implementing a requested user action from a requesting user and/or an implementing user.

10. The method of claim 1, wherein an address comprising one of an IP address and an address of a global positioning system (GPS) associated with a timestamp obtaining process is triggered by user responses and/or actions when being interactive with the system and/or platform to generate the one or multiple obtained address.

11. The method of claim 8, wherein an address comprising one of an IP address and an address of a global positioning system (GPS) associated with a timestamp obtaining process is triggered by user responses and/or actions when being interactive with the system and/or platform to generate the obtained address.

12. The method of claim 9, wherein an address comprising one of an IP address and an address of a global positioning system (GPS) associated with a timestamp obtaining process is triggered by user responses and/or actions when being interactive with the system and/or platform to generate the obtained address.

13. The method of claim 1, wherein the purchase address is extracted from the purchase proof supplied by the implementing user and/or the purchase certification supplied by the business owner, to obtain the extracted purchase address.

14. The method of claim 5, wherein the purchase address is extracted from the purchase proof supplied by the implementing user and/or the purchase certification supplied by the business owner, to obtain the extracted purchase address.

15. The method of claim 1, wherein the verification of purchasing activity is further implemented by the comparison of one or multiple extracted purchase address with the purchase address comprised in the referral information.

16. The method of claim 1, wherein the verification of purchasing activity is further implemented by comparing the obtained address of the implementing user with the purchase address comprised in the referral information, and comparing the obtained address of the implementing user with the extracted address.

17. The method of claim 1, wherein a fee charged by the business owner, a reward to a user who referred, and a service fee to be paid to the implementing user are calculated and determined by the system and/or platform based on the results of verified purchasing activity and/or purchase action, comprising at least one of a number of verified purchases made from a referral information, a total amount of verified purchases from a referral information, a ratio between visits and purchases for a referred store.

\* \* \* \* \*